Sept. 11, 1923.
B. M. W. HANSON
BALL BEARING
Filed April 16, 1921
1,467,378
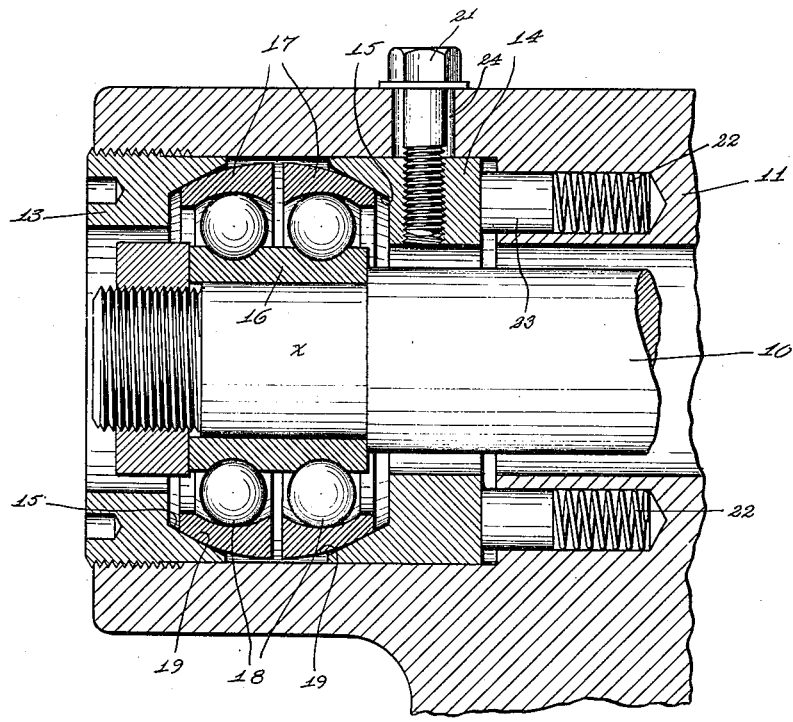
Inventor
Bengt M W Hanson
By J. Hulbert.
His Attorney Patented Sept. 11, 1923.

1,467,378

UNITED STATES PATENT OFFICE.

BENGT M. W. HANSON, OF HARTFORD, CONNECTICUT, ASSIGNOR TO SKAYEF BALL BEARING COMPANY, OF WEST HARTFORD, CONNECTICUT, A CORPORATION OF CONNECTICUT.

BALL BEARING.

Application filed April 16, 1921. Serial No. 461,959.

*To all whom it may concern:*

Be it known that I, BENGT M. W. HANSON, a citizen of the United States, and a resident of Hartford, in the county of Hartford, State of Connecticut, have invented certain new and useful Improvements in a Ball Bearing, of which the following is a specification.

The aim of the present invention is to provide an improved ball bearing arrangement wherein slight inaccuracies in the construction of the parts and errors or variations in the alinement of the shaft to which the bearing is applied, are automatically taken care of, the parts being capable of adjusting themselves to secure the best running condition; also wherein wear between the parts may be readily taken up.

In the drawing the figure is a central longitudinal section of an arrangement in which the present invention is incorporated.

In the embodiment illustrated 10 designates a spindle and 11 a housing, one of these members, in the present instance the spindle, being rotary and the other stationary. Fitted against rotation within the housing are a pair of collars 13, 14, and these collars, at their opposed ends, have their internal peripheries tapered in opposite directions to provide conical seats 15. Interposed between these collars and the shaft are a pair of ball bearing units which, in the present instance, include an inner ring 16 fixed to the shaft and having a pair of races; a pair of outer rings 17, one positioned within each seat 15; and anti-friction balls 18 interposed between the outer and inner rings. The external peripheries 19 of the outer rings are of such shape that these two rings taken together form the center zone of a sphere. The center of curvature of these peripheries is indicated at *x* in the drawings and this center lies in the axis of the shaft *a*. It will be evident that as the external peripheries of the outer rings are parti-spherical and the seats 15 are conical each outer ring is capable of a universal movement relative to its respective supporting collar and it is thus enabled to assume its proper position relative to the other parts. Also in the event the shaft is not in exact predetermined alinement the bearing as a whole may accommodate itself within the socket provided by the seats 15.

The collar 14 is slidably mounted within the housing and is urged towards the other collar by springs 22 acting through the plungers 23. This collar may be locked in any position of adjustment by the screw 21 extending through a slot 24 in the housing. If desired, the screw 21 may be dispensed with and the springs 22 alone may be relied upon to hold the collar in operative position. It will be seen that when the screw 21 is untightened, the springs urge the sliding collar towards the fixed one and the result of this action will be to take up wear which may occur in the bearings. The strength of the springs is such that they will hold the parts in proper association, without undue cramping of the anti-friction balls between the bearing rings. To properly adjust the parts to take up wear, it is merely necessary to untighten the screw 21 whereupon the springs will automatically bring the parts into proper relation, and then the screw may be tightened up to hold the collar 14 in its adjusted position.

It is, of course, obvious that the invention is susceptible of various modifications and changes which are within the spirit of the invention without departing from the scope of the following claims, it being understood that the present disclosure of the invention is by way of illustration only and it is not to be taken as restrictive of my conception.

I claim as my invention:—

1. In a device of the character described, an inner member, an outer member including a pair of collars one adjustable towards the other, resilient means normally urging one collar relative to the other one, one of said members being stationary and the other rotary; and a ball bearing including an inner ring fixed to the inner member, a pair of outer rings respectively seating in said collars, and anti-friction balls interposed between said inner and outer rings.

2. In a device of the character described, an inner member, an outer member including a pair of collars having opposed conical seats, resilient means normally urging one of said collars relative to the other one, one of said members being stationary and the other rotary; and a ball bearing including an inner ring fixed to the inner member, a pair of outer rings the external peripheries of which form the central zone of a sphere engaging in said seats, and anti-friction balls interposed between said inner and outer rings.

3. In a device of the character described, a housing, a pair of collars mounted therein for adjustment one towards the other, resilient means urging one of said collars towards the other, means for clamping the adjustable collar in any position of adjustment, a spindle in said housing; and a ball bearing including a ring fixed to said spindle, a pair of outer rings respectively seating in said collars and anti-friction balls interposed between said inner and outer rings.

4. In a device of the character described, a housing, a pair of collars mounted therein for adjustment one relative to the other, spring-pressed plungers carried by the housing urging one of said collars towards the other one, a screw for clamping said adjustable collar in any position of adjustment; and a ball bearing including a ring fixed on the spindle, a pair of outer rings the external peripheries of which form the central zone of a sphere and engaging in said collars, and anti-friction balls interposed between said inner and outer rings.

BENGT M. W. HANSON.